United States Patent [19]

Spatz et al.

[11] 4,186,115

[45] Jan. 29, 1980

[54] NOVEL RADIATION CURABLE COATING COMPOSITIONS FOR PRESSURE-SENSITIVE TRANSFER SHEETS

[75] Inventors: Sydney M. Spatz, Circleville; Robert C. Hydell; Gerald T. Davis, both of Chillicothe, all of Ohio

[73] Assignee: The Mead Corporation, Dayton, Ohio

[21] Appl. No.: 915,506

[22] Filed: Jun. 14, 1978

Related U.S. Application Data

[62] Division of Ser. No. 697,019, Jun. 17, 1976, Pat. No. 4,138,508.

[51] Int. Cl.$^2$ .............................................. C08L 91/00
[52] U.S. Cl. .................................. 260/22 R; 106/21; 106/28; 106/32; 260/23 AR; 260/31.8 R; 260/31.8 XA; 260/33.6 UA; 260/33.6 R; 260/33.8 R; 260/33.8 UA; 282/27.5; 428/914
[58] Field of Search .................... 106/14.5, 21, 28, 32; 260/22 R, 23 AR, 31.8 R, 31.8 XA, 33.6 R, 33.6 UA, 33.8 R, 33.8 UA; 282/27.5; 427/35, 36, 42–44, 54, 55, 150–153; 428/307, 500, 511–514, 913, 914

[56] References Cited

U.S. PATENT DOCUMENTS

| | | | |
|---|---|---|---|
| 3,020,170 | 2/1962 | Macaulay | 4/415 |
| 3,720,534 | 3/1973 | Macaulay et al. | 428/327 X |
| 3,754,966 | 8/1973 | Newman et al. | 427/44 X |
| 4,091,122 | 5/1978 | Davis et al. | 427/44 |
| 4,112,138 | 9/1978 | Davis et al. | 427/54 |

FOREIGN PATENT DOCUMENTS 941549  11/1963  United Kingdom ................... 282/27.5
1242740  8/1971  United Kingdom ................... 282/27.5

Primary Examiner—George F. Lesmes
Assistant Examiner—Bruce H. Hess
Attorney, Agent, or Firm—Charles N. Shane, Jr.; Stephen H. Cagle; Wilson G. Palmer

[57] ABSTRACT

A novel chromogenic composition is produced comprising at least one color precursor dissolved in a carrier oil, the carrier oil being a weakly polar solvent having a boiling point of from about 180° C. to about 300° C., the color precursor being of the electron donor type and being reactive with color developers of the electron acceptor type to form an image and a liquid radiation curable substance, the liquid radiation curable substance being selected from the group consisting of isocyanate modified acrylic, methacrylic and itaconic acid esters of polyhydric alcohols, acrylic prepolymers derived from partial esterification of pentaerythritol with acrylic acid and acrylic acid esters and mixtures thereof, the liquid radiation curable substance being curable to a frangible resin upon exposure to radiation. The coating composition has a viscosity in the range of about 1000 cps. to about 3500 cps. A pressure-sensitive, carbonless transfer sheet is produced comprising a paper substrate having coated thereon a barrier layer and a cured resinous film coated on said barrier layer, the cured resinous film being a radiation cured film of the novel chromogenic coating composition having a frangibility that will permit passage of the color precursor and the carrier oil to the surface of the cured resinous film when the cured resinous film is broken, the color precursor solution being retained as small occlusions within a matrix of closely packed cross-linked molecular chains of cured resin.

2 Claims, No Drawings

NOVEL RADIATION CURABLE COATING COMPOSITIONS FOR PRESSURE-SENSITIVE TRANSFER SHEETS

This is a division of application Ser. No. 697,019, filed June 17, 1976 now U.S. Pat. No. 4,138,508.

BACKGROUND OF THE INVENTION

This invention relates to the production of pressure-sensitive, carbonless transfer sheets for use in combination with pressure-sensitive record sheet of the type whereby on application of pressure, a chromogenic material is transferred from the carbonless transfer sheet to the record sheet which then develops a visible image. More particularly, it relates to the production of a pressure-sensitive carbonless transfer sheet having a coating containing a chromogenic material, which coating is cured to a solid film by radiation means. For purposes of this application the term "chromogenic" shall be understood to refer to materials such as color precursors, color developers and other color formers. Additionally, the term CF shall be understood to refer to a coating normally used on a record sheet and the term CB shall be understood to refer to a coating normally used on a transfer sheet.

Carbonless paper, briefly stated, is a standard type of paper wherein during manufacture the backside of the paper substrate is coated with what is referred to as a CB coating which contains one or more color precursors generally encapsulated in solution form. At the same time the front side of the paper substrate is coated during manufacture with what is referred to as a CF coating, which contains one or more color developers. Both the color precursor and the color developer remain in the coating compositions on the respective back and front surfaces of the paper in colorless form. This is true until the CB side of one sheet and the CF side of a second sheet are brought into overlying relationship and when sufficient pressure, as by a typewriter, is applied to rupture the CB coating to release the color precursor solution. At this time the color precursor contacts the CF coating and reacts with the color developer therein to form an image. Carbonless paper has proved to be an exceptionally valuable image transfer media for a variety of reasons only one of which is the fact that until a CB coating is placed next to a CF coating both coatings are in an inactive state since the co-reactive elements are not in contact with one another. Patents relating to carbonless paper products are:

U.S. Pat. No. 2,712,507 (1955) to Green;
U.S. Pat. No. 2,730,456 (1956) to Green et al;
U.S. Pat. No. 3,455,721 (1969) to Phillips et al;
U.S. Pat. No. 3,466,184 (1969) to Bowler et al;
U.S. Pat. No. 3,672,935 (1972) to Miller et al.

Generally, the commercially successful transfer papers utilize microencapsulated oil solutions of color precursors applied as an adherent coating to the paper substrate. The microcapsule containing coating compositions used to prepare these papers are aqueous based and generally contain a binder for the microcapsules.

Transfer papers have been developed in which the oil solution of the color precursor has not been encapsulated, but rather is dispersed in an aqueous or organic solvent which contains a gelatin or resinous component. These dispersions are then coated onto a paper substrate and then dried by heat to give a pressure rupturable film having minute droplets as opposed to microcapsules of the oil solution distributed therein. Such transfer papers and processes for making them are described, for example, in the following patents:

U.S. Pat. No. 2,374,862 (1945) to Green;
U.S. Pat. No. 2,550,466 (1951) to Green et al;
U.S. Pat. No. 3,020,170 (1962) to Macaulay;
U.S. Pat. No. 3,020,171 (1962) to Bakan et al;
U.S. Pat. No. 3,079,351 (1963) to Staneslow et al;
U.S. Pat. No. 3,305,382 (1967) to Oronik.

A disadvantage of coated paper products such as carbonless copy paper stems from the necessity of applying a liquid coating composition containing the color forming ingredients during the manufacturing process. In the application of such coatings volatile solvents are sometimes used which then in turn require evaporation of excess solvent to dry the coating, thereby producing volatile solvent vapors. An alternate method of coating involves the application of the color forming ingredients in an aqueous slurry, again requiring removal of excess water by drying. Both methods suffer from serious disadvantages. The solvent coating method involves the production of generally volatile solvent vapors creating both a health and a fire hazard in the surrounding environment. When using an aqueous solvent system the water must be evaporated which involves the expenditure of significant amounts of energy. Further, the necessity of a drying step requires the use of complex and expensive apparatus to continuously dry a substrate which has been coated with an aqueous coating compound. A separate but related problem involves the disposal of polluted water. The application of heat not only is expensive, making the total paper manufacturing operation less cost effective, but also is potentially damaging to the color forming ingredients which are generally coated onto the paper substrate during manufacture. High degrees of temperature in the drying step require specific formulation of wall-forming compounds which permit the use of excess heat. The problems encountered in the actual coating step are generally attributable to the necessity for a heated drying step following the coating operation.

In general, patents concerned with the production and application of liquid resin compositions containing no volatile solvent, which resin compositions are subsequently cured by radiation to a solid film are:

U.S. Pat. No. 3,551,235 (1970) to Bassemir et al;
U.S. Pat. No. 3,551,246 (1970) to Bassemir et al;
U.S. Pat. No. 3,551,311 (1970) to Nass et al;
U.S. Pat. No. 3,558,387 (1971) to Bassemir et al;
U.S. Pat. No. 3,661,614 (1972) to Bassemir et al;
U.S. Pat. No. 3,754,966 (1973) to Newman et al;
U.S. Pat. No. 3,772,062 (1973) to Shur et al;
U.S. Pat. No. 3,772,171 (1973) to Savageau et al;
U.S. Pat. No. 3,801,329 (1974) to Sandner et al;
U.S. Pat. No. 3,819,496 (1974) to Roskott et al;
U.S. Pat. No. 3,847,769 (1974) to Garratt et al,
U.S. Pat. No. 3,847,768 (1974) to Kagiya et al.

These compositions generally also contain a pigment or a dye. Such resin compositions are useful for protective coatings and fast drying inks. U.S. Pat. No. 3,754,966 describes the production of an ink releasing dry transfer element which can be used as a carbon paper or typewriter ribbon.

The novel liquid coating composition of this invention contains an oil solution of a chromogenic material in addition to a liquid radiation curable substance. Prior to the discovery of this invention, it was not known that oil solutions of chromogenic material could be dispersed without encapsulation in radiation curable coating compositions and retain their chromogenic properties after the resin is cured by radiation to a tack-free film. For purposes of this disclosure, a tack-free film is one which will separate cleanly from a cotton ball lightly pressed against the film. The cotton fibers will not adhere to the film surface.

STATEMENT OF THE INVENTION

In accordance with one aspect of the invention, a process is provided for producing a pressure-sensitive carbonless transfer sheet comprising preparing a solution of a first chromogenic material, the solution of the first chromogenic material including at least one chromogenic compound dissolved in a carrier oil, and the first chromogenic material being reactive with a second chromogenic material in the presence of the carrier oil to form a color. The solution of the first chromogenic material is mixed with a liquid radiation curable substance to form a coating composition, the liquid radiation curable substance being curable to a frangible resin and compatible with the color-forming capabilities of said first chromogenic material. A film forming material is applied to a substrate, the film forming material being settable to form a barrier layer which substantially prevents penetration of the substrate by the coating composition upon application of the coating composition to the substrate. The film forming material is then set to form a barrier layer on the substrate, and a film of the coating composition is applied over the barrier layer. The coating composition is then cured by subjecting the coating composition to radiation for a period of time sufficient to cure the coating composition containing the radiation curable substance to a frangible resinous film, the frangible resinous film being cured to a frangibility that will permit passage of the solution of the first chromogenic material to the exposed surface of the frangible resinous film when the frangible resinous film is broken.

In accordance with another aspect of the invention, a novel chromogenic composition is produced comprising at least one color precursor dissolved in a carrier oil, the carrier oil being a weakly polar solvent having a boiling point of from about 180° C. to about 300° C., the color precursor being of the electron donor type and being reactive with color developers of the electron acceptor type to form an image and a liquid radiation curable substance, the liquid radiation curable substance being selected from the group consisting of isocyanate modified acrylic, methacrylic and itaconic acid esters of polyhydric alcohols, acrylic prepolymers derived from partial esterification of pentaerythritol with acrylic acid and acrylic acid esters and mixtures thereof, the liquid radiation curable substance being curable to a frangible resin upon exposure to radiation. The coating composition has a viscosity in the range of about 1000 cps. to about 3500 cps.

In accordance with still another aspect of this invention, a pressure-sensitive, carbonless transfer sheet is produced comprising a paper substrate having coated thereon a barrier layer and a cured resinous film coated on said barrier layer, the cured resinous film being a radiation cured film of the novel chromogenic coating composition having a frangibility that will permit passage of the color precursor and the carrier oil to the surface of the cured resinous film when the cured resinous film is broken, the color precursor solution being retained as small occlusions within a matrix of closely packed cross-linked molecular chains of cured resin.

DETAILED DESCRIPTION OF THE INVENTION

The process of this invention for producing a transfer (CB) sheet is not dependent on the production of capsules or microcapsules to contain an oil solution of chromogenic material. The use of such microcapsules in a radiation curable medium in the production of transfer sheets is disclosed in commonly assigned co-pending U.S. application Ser. No. 684,462 filed May 7, 1976, now U.S. Pat. No. 4,091,122. The instant invention involves the incorporation of an oil solution of at least one chromogenic material in a radiation curable medium without encapsulation or microencapsulation of the solution of chromogenic material. This feature has several advantages not the least of which is elimination of the complicated and time-consuming encapsulating step. There is also no necessity for separating microcapsules from the aqueous or oily media in which microcapsules are ordinarily produced. Instead, the oil solution of chromogenic material can be simply mixed into the radiation curable composition and this coating composition may then be applied to a substrate.

The coating composition of this invention is essentially a mixture of an oil solution of a first chromogenic material and a radiation curable substance. The coating composition is applied as a liquid film to a substrate, such as paper or plastic, and the coating composition is cured to a frangible resinous film having occlusions containing the oil solution of the chromogenic material. Breaking or crushing of the frangible film as by striking it with a typewriter key releases the oil solution of the first chromogenic material which may then be transferred by contact to a CF sheet containing a second chromogenic material to give a colored image.

The coating composition may contain additional materials which function as photoinitiators. The addition of these materials depends upon the particular method of curing the chromogenic coating. Absorbent filler materials can also be added to modify the properties of the cured film. The use of non-reactive volatile solvents, which require heat to remove them during the drying or curing of the coated film, is avoided. However, minor amounts of non-reactive solvents can be tolerated without requiring a separate step for drying during any subsequent curing step. Although the product and process of this invention are useful in the manufacture of a variety of products the preferred use of the process and product of this invention is in the continuous production of a manifold carbonless substrate.

The chromogenic materials useful in the preparation of the transfer sheets of this invention are the oil soluble color formers which will produce a color with a second color former in the presence of a selected carrier oil. As in the prior art, the color precursors are the chromogenic materials most generally used. However, certain of the color developers, such as the phenols and phenolic resins, are oil soluble and may be used in the preparation of transfer sheets if desired.

The preferred color precursors most useful in the practice of this invention are the electron-donor type and include the lactone phthalides, such as crystal violet lactone and 3,3-bis-(1'-ethyl-2'methylindol-3'-yl) phthalide, the lactone fluorans, such as 2-dibenzylamino-6-diethylaminofluoran and 6-diethylamino-1,3-dimethyl-fluorans, the lactone xanthenes, the leucoauramines, the 2-(omega substituted vinylene)-3,3-disubstituted-3-H indoles and 1,3,3-trialkylinodolinospirans. Mixtures of these color precursors can be used if desired. Transfer sheets using the above color precursors can be used in combination with sheets coated with acidic electron-acceptor materials, such as organic acids, phenols, phenolic acids, phenolic polymers and Lewis acids and clays, to give a colored image.

Organic chemicals which are capable of reacting with heavy metal salts to give colored metal complexes, chelates or salts can be adapted for use as the color precursor in this invention. For example, propyl gallate in an oil such as monoisopropylbiphenyl can be dispersed in a radiation curable substance, coated on a paper substrate and cured by radiation to give a transfer (CB) sheet which may be used with a record (CF) sheet containing ferric naphthenate or vanadium acetylacetonate to yield blue-black to black colored images.

Chromogenic materials, such as the color precursors, are present in such oil solutions, sometimes referred to as carrier oil solutions, in an amount of from about 0.5% to about 20.0% based on the weight of the carrier oil solution, and the most preferred range is from about 2% to about 7%.

The carrier oils useful in this invention are solvents for the color precursor. Preferably they are weakly polar solvents boiling upwards of 170° C., preferably from about 180° C. to about 300° C. Examples of such solvents are the alkylated biphenyls, preferably monoisopropylbiphenyl, the polychlorinated biphenyls, dioctyl phthalate, castor oil, mineral oil, naphthenic mineral oils and mixtures thereof. A glossy wet appearance of the coated substrate sometimes encountered when using the above solvents can be eliminated by the use of up to 20% of Solvent 2251 (an alkane solvent of a boiling point range of 193° C. to 260° C. sold by Penreco Inc.) or xylene.

The radiation curable substance useful in the practice of this invention comprises the free radical polymerizable ethylenically unsaturated organic compounds. These compounds must contain at least one terminal ethylenic group per molecule. These compounds are liquid and act as a dispersing medium for the oil solution of chromogenic material and other ingredients of the coating composition. Therefore, they must be compatible with the color forming capabilities of the chromogenic material. The radiation curable substance is curable to a frangible resin when exposed to ionizing radiation. Curing is by polymerization, including crosslinking.

A preferred group of radiation curable substances is the isocyanate modified acrylic, methacrylic and itaconic acid esters of polyhydric alcohols. The preparation of such isocyanate modified esters is given in U.S. Pat. No. 3,783,151, issued Jan. 1, 1974 to Carlick et al, U.S. Pat. No. 3,759,809 issued Sept. 18, 1973 to Carlick et al and U.S. Pat. No. 3,825,479, issued July 3, 1974 to Carlick et al.

Radiation curable compositions based on these isocyanate modified esters and including reactive diluents such as tetraethylene glycol diacrylate as well as photoinitiators, such as chlorinated resins, chlorinated paraffin and amine photoinitiation synergists together with viscosity adjusting agents such as butyl Cellosolve acetate or hexadecyl alcohol, a thermal inhibitor, such as hydroquinone, and a silicone slip agent are commercially available as overprint varnishes from Sun Chemical Corporation, Carlstadt, N.J. under the tradename of Suncure resin coatings. Suncure Resin GA 72-0020 radiation curable composition, having the following formulation, was found to be particularly useful in the practice of this invention.

|  | Parts by Weight |
|---|---|
| Isocyanate modified ester | 46 |
| Reactive diluent-tetraethyleneglycol diacrylate | 21 |
| Photoinitiators-chlorinated resin and an amine accelerator | 28 |
| Viscosity adjusting agent | 5 |
| Thermal inhibitor-hydroquinone | 0.1 |
| Slip agent-silicone oil | 0.04 |

The viscosity of the above formulation was from about 1300 to about 1800 centipoises (cps.).

Another preferred radiation curable substance is an acrylate prepolymer derived from the partial reaction of pentaerythritol with acrylic acid or acrylic acid esters. Radiation curable compositions based on such prepolymers having an acrylate functionality of between about 2 and 3 are available commercially in a two-package system radiation curable composition from the Richardson Company, Melrose Park, Ill. The packages are identified as RL-1482 and RL-1483 and are recommended to be mixed together to form a radiation curable clear varnish in a ratio of 4.4 parts of RL-1482 to 1 part of RL-1483. The RL-1482 package was identified by the manufacturer as also containing the acrylate prepolymer together with a fluorinated hydrocarbon photoinitiator. The RL-1483 package contained a silicone oil to improve flow characteristics and a benzoin ether photoinitiator.

As with the Suncure resins, the isocyanate modified ester may be replaced in part by a reactive diluent such as a tetraethyleneglycol diacrylate. Reactive diluents, such as these polyol diacrylates, are radiation curable but are of a lower viscosity than the isocyanate modified esters and may be used to lower the viscosity of the coating compositions to an acceptable range of from about 1000 cps. to about 3500 cps. The preferred range of viscosity is from about 1200 cps. to about 2000 cps.

After the color precursor solution and the liquid radiation curable composition have been formed they are mixed together to form a coating composition. This mixing can be done by stirring, milling or other forms of agitation. The particular form of mixing is not critical and is within the known ability of the art. In a preferred embodiment of this invention, it has been found that the inclusion of a carrier oil, such as monoisopropylbiphenyl (hereinafter sometimes called MIPB), with compositions containing the radiation curable substance and a chromogenic material solution provides a formulation which when coated on a glass plate can be cured to a non-sticky, excellently imaging film.

In the preferred embodiment of this invention, the chromogenic material-carrier oil solution is present in the coating composition in a range of from about 17% to about 40% based on the total weight of the coating composition. A preferred range is from about 20% to about 32%, by weight of the coating composition and a most preferred range is from about 23% to about 27% by weight of the coating composition.

The coating composition may be applied to a substrate, such as paper or a plastic film by any of the common paper coating processes such as roll, knife, or blade coating, or by any of the common printing processes, such as offset, gravure, or flexographic printing.

The rheological properties, particularly the viscosity, of the coating composition, can be adjusted for each type of application by proper selection of the type and relative amounts of liquid radiation curable compounds, including reactive diluents, and viscosity adjusting agents. While the actual amount of coating composition applied to the substrate can vary depending on the particular final product desired, coat weights above about 6 pounds per 1300 square feet of substrate have been found to give acceptable results. The preferred range of CB coat weight application is from about 7 pounds to about 12 pounds per 1300 square feet of substrate, while the most preferred range is from about 8 pounds to about 10 pounds per 1300 square feet of substrate.

These coating compositions can be cured by any free radical initiated chain propagated addition polymerization reaction of the terminal ethylenic groups of the radiation curable compounds. These free radicals can be produced by several different processes including the thermal or ultraviolet induced degradation of certain molecular species referred to as photoinitiators and any form of ionizing radiation utilizing alpha-particles, beta-rays (high-energy electrons), gamma-rays, X-rays and neutrons. Examples of photoinitiators suitable for this invention include the following: chlorinated paraffin, benzoin ethyl ether, desyl chloride, desyl amine and chlorinated aliphatic hydrocarbons. The actual exposure time necessary for curing of the chromogenic coating composition is dependent on a number of variables such as coat weight, coat thickness, the particular radiation curable substance, type of radiation, source of radiation, radiation intensity and distance between the radiation source and the coated substrate. To expedite the cure time with minimal heat exposure, the curing can be effected beneficially on a moving platform or conveyor belt with a bank of high wattage ultraviolet lamps over the conveyor as is used currently in the curing of resin coated papers and other base supports. Under these conditions almost instantaneous curing can be obtained.

Curing of the coating composition by irradiation causes the radiation curable substance to form a matrix of closely packed cross-linked molecules of cured resin. This matrix becomes increasingly dense as the curing progresses and the molecules become larger. The oil solution of chromogenic material is retained as small occlusions within this matrix. The coating composition containing the radiation curable substance is cured as by ultraviolet or electron beam radiation, to a frangible resinous film. Shattering of this resinous film as by writing with a stylus or striking with a typewriter key releases the occluded oil solution of chromogenic material and permits passage of the oil solution to the surface of the resinous film where it is transferred by pressure contact to a record sheet and a colored image duplicating the pressure image is formed.

If the resin coating is over-cured by excessive radiation, the densely cross-linked resin will be too tough to permit breakthrough of the oil solution of chromogenic material to the CF sheet. Hence, no copy images will be produced by the usual pressures of typing or writing. Additionally, if the substrate is somewhat porous or not protected with an oil-impermeable barrier layer, then it has been found that some of the oil solution in the resin formulation will penetrate through to the back side of the substrate.

If a paper substrate is to be used, the application of a barrier layer prior to application of the radiation curable coating composition has been shown to have significant advantages as follows. Penetration by the coating composition, in particular, by the oil solution of chromogenic material, into and through the paper substrate during coating and curing is substantially prevented. In using the transfer sheet, the oil solution of chromogenic material released by fracturing the cured film is not absorbed by the paper, but is available for transfer to the record (CF) sheet to produce a more intense colored image.

The barrier layer is formed by applying a coating of a film-forming material to the paper substrate followed by drying or otherwise setting the coating. In an alternate process of this invention, a radiation curable film-forming material is applied to a paper substrate and is then set to a resinous consistency by exposure to radiation. When using film-forming materials which are not radiation curable, the dried paper having the barrier layer thereon may be calendered, if desired, prior to applying the chromogenic coating composition. After setting the coating, the radiation curable coating composition may be applied over the resultant barrier layer. The coating of film-forming material may be applied to the paper substrate by any of the ordinary coating methods, for example, by tubsizing or roll, air-knife, blade or spray coating. The preferred film forming materials are the hydrophilic film formers, which include polyvinyl alcohol (PVA), polyvinyl acetate, polyvinyl chloride, methylcellulose, ethylcellulose, hydroxypropylcellulose, starch and mixtures thereof all of which may be applied as aqueous coatings. Radiation cured ethylenically unsaturated resin films have also been successfully used as a barrier layer, and have the advantage of being relatively smooth without calendering. The amount of film forming material necessary to produce a barrier layer impermeable to the carrier oil solution, as well as other ingredients of the coating composition, will vary somewhat depending on the particular film-forming material, the method of application of the film-forming material, the porosity of the paper substrate and the setting, drying and calendering operations. In general, a coat weight of from about 0.75 to about 1.25 pounds (dry) per 1300 square feet of substrate will be sufficient to produce the oil-impermeable barrier layer of this invention. It is important to note also that the film forming material must not interfere with the appearance of the final paper product and in this respect must be colorless or transluscent.

Improvement in the intensity of the colored image was also improved by the addition of up to about 12% of an absorbent filler into the coating composition. Such fillers include diatomite (Dicalite White Filler and Dicalite Cellu-Aid 2, both commercially available from Grefco, Inc., Florence, Ky. and Celite 503, available from John-Manville, Denver, Colo.), a sodium potassium aluminum silicate filler (perlite 416-Grefco), cellulose floc (Solka Floc BW 200 and Solka Floc BW 100, Grefco) and a finely divided silane treated silicon dioxide, (Silanox, available from Cabot Corporation, Boston, Mass.). A preferred amount of absorbent filler is from about 2% to about 11% of the coating composition, while a most preferred amount is from about 5.7% to about 6.2% of the coating composition.

The preferred curing process is by exposure of the coated substrate to ultraviolet radiation having a wave length of about 2000° A. to about 4000° A. In the following examples, curing was obtained by exposure to a Hanovia 200 watt medium pressure mercury vapor lamp, Model #654 A 0100, having an arc of 4.5 inches in which the coated sheet was placed approximately 6½ inches from the lamp. Under these conditions relatively long curing times were necessary. The transfer (CB) sheets produced were evaluated by typing against three different commercially available CF sheets, namely acid (Silton) clay CF, kaolin clay-phenolic resin CF and phenolic resin CF sheets. These sheet pairs were imaged with an electric typewriter using the character "m" in a repeating block pattern, and the intensity of the images was measured as the ratio of the reflectance of the imaged area to the reflectance of the unimaged background, after an elapsed time of 10 minutes. Thus, the more intense or darker images show as lower values, and higher values indicate weak or faint images. This test is called Typwriter Intensity and may be expressed mathematically as T.I.$=(100)(R_i/R_o)$ where $R_i$ is reflectance of the imaged area and $R_o$ is reflectance of the background (unimaged) area as measured with a Bausch and Lomb Opacimeter.

The following examples illustrate the preferred embodiments, but do not limit the invention. Amounts are in parts by weight throughout the examples.

EXAMPLE 1

A color precursor solution of 0.143 parts of crystal violet lactone, 0.286 parts of 2-dibenzylamino-6-diethylaminofluoran and 0.071 parts of 3,3-bis-(1'-ethyl-2'-methylindol-3'-yl)phthalide in 9 parts of monoisopropylbiphenyl was mixed thoroughly with 15.3 parts of Richardson RL-1482 radiation curable composition. After thorough mixing there was added with mixing 3.45 parts of Richardson RL-1483 benzoin ether photoinitiator. Drawdown coatings were made using a No. 29 Mayer bar on the wire side of several sheets of 13 pound per 1300 square feet bond paper. Coated paper sheets were irradiated at intervals of 1, 2, 3, 4, and 5 minutes using the Hanovia lamp described supra with the coated side of the paper facing the light source. The cured coated sheets were placed in contact with a kaolin clay-phenolic resin CF sheet for test typing in each of the following ways.

1. Coated side to CF sheet.
2. Uncoated side to CF sheet.

Of the coated sides typed against the CF sheets, only the one-minute sample gave a good typed sheet. On the other hand, all of the uncoated sides gave a good typed image indicating that in all cases the precursor solution penetrated the paper substrate.

The above test indicates that in the absence of a barrier coating on the side to be coated with a radiation curable mixture containing a color precursor solution, the color precursor solution will be forced to the back side of the sheet and through the sheet during the cure.

EXAMPLE 2

A warm color precursor solution of 0.2 parts of crystal violet lactone, 0.4 parts of 2-dibenzylamino-6-diethylaminofluoran and 0.1 parts of 3,3-bis-(1'-ethyl-2'-methylindol-3'-yl)phthalide in 3.0 parts of monoisopropylbiphenyl was thoroughly mixed with 10 parts of Sun Chemical's Suncure Resin GA-72-0020 radiation curable overprint varnish. The mix was coated with a No. 20.5 Mayer Bar on a 15 pound bond paper which had been precoated by glass rod with about 1 pound per 1300 square foot of the same Suncure Resin and cured by irradiation. The pre-coated sheet imaged well on acid (Silton) clay CF paper.

EXAMPLE 3

The color precursor/MIPB/Suncure Resin composition, of Example 2 was coated with a No. 20.5 Mayer Bar on a 12 pound bond paper previously coated with aqueous PVA resin dried and calendered (PVA coat weight was about 1.0 pounds per 1300 square foot). The coat weight of the coated CF resin was about 10 lbs. per 1300 square feet. The cured sheets were dry on both sides and showed little or no evidence of solvent loss by penetration of the backside of the cured sheet.

The coated side gave very good images when typed against phenolic resin CF, kaolin clay-phenolic resin CF and acid (Silton) clay CF coated papers.

EXAMPLE 4

The color precursor/MIPB/Suncure resin composition of Example 2 to which there was added and mixed in one case 0.9 parts Celite 503 (diatomite-baker) and in the other case 0.9 parts of Dicalite White Filler (a purified diatomite-Grefco, Inc.), were coated on the PVA-coated 12 pound bond paper of Example 3. The three minute cured sheets gave typed images on the same three test papers that were more uniform in intensity and more intense than the corresponding images from Example 3.

EXAMPLE 5

A color precursor mix consisting of 0.25 parts of 2-dibenzylamino-6-diethylaminofluoran, 0.20 parts of crystal violet lactone and 0.05 parts of 3,3-bis-(1'-ethyl-2'-methylindol-3'-yl)phthalide in 2.0 parts of MIPB (Santasol 200) was mixed with 4.5 parts of Suncure Resin GA-72-0020 radiation curable composition. To this composition was mixed in 0.4 parts Solka Floc BW 200 cellulose floc and 0.3 parts of Dicalite White Filler. Drawdowns made with a No. 29 Mayer Bar on PVA-coated 14 pound bond paper were irradiated for four minutes. The cured coated sheets, dry on both sides, gave a typed, purple-blue image on an acid (Silton) clay coated CF sheet (typewriter intensity=72) and a green-grey image (typewriter intensity=74) on a phenolic resin CF coated sheet.

EXAMPLE 6

Example 5 was repeated using 0.7 part Dicalite White Filler instead of the mixture of 0.4 part Solka Floc BW 200 and 0.3 part Dicalite White Filler. The cured coated sheets had a smoother coating than the sheet of Example 5 and a sharper, more intense image. The image was dark green with a phenolic resin CF sheet (Typewriter Intensity=69) and was a dark burgundy with an acid (Silton) clay CF sheet (Typewriter Intensity=64).

EXAMPLE 7

A color precursor-resin system was prepared according to Examples 1–6 inclusive, containing the following:
0.2 parts of 2-dibenzylamino-6-diethylaminofluoran;
0.1 parts of crystal violet lactone;
0.05 parts of 3-bis-(1'-ethyl-2'-methylindol-3'-yl)phthalide;
0.05 parts of benzoylleucomethylene blue;
1.5 parts MIPB carrier oil;
1.5 parts of Suncure Resin GA 72-0020 radiation curable overprint varnish;

0.5 parts of Dicalite White Filler diatomite.

Variously controlled drawdowns of the above composition were made on a 12 pound bond paper, previously coated with PVA resin and smoothed by calendering. Typewriter intensities of the typed images on acid (Silton) clay CF, phenolic resin CF and kaolin clay-phenolic resin CF showed declining intensities (i.e., increasing numbers) with decreasing thickness (decreasing Mayer Bar No.) of the Mayer bar coating, (See Table I.). The CB sheets were cured by ultraviolet radiation for 6 minutes.

TABLE I

Effect of Mayer Bar Coating Thickness On Image Intensity

| Mayer Bar | Silton Clay/CF | Phenolic Resin | Kaolin-Phenolic Resin |
| --- | --- | --- | --- |
| No. 20 | 66 | 68 | 83 |
| No. 14 | 80 | 76 | 89 |
| No. 10 | 80 | 74 | 93 |
| No. 6 | 80 | 79 | 90 |

The No. 20 Mayer bar gave a coat weight of about 8.4 pounds per 1300 square feet.

What is claimed is:

1. A coating composition for coating a substrate to form a pressure-sensitive, carbonless transfer sheet comprising:

(a) at least one color precursor dissolved in a carrier oil, said carrier oil being a weakly polar solvent having a boiling point of from about 180° C. to about 300° C., said color precursor being of the electron donor type, said color precursor being reactive with color developers of the electron acceptor type to form a color and said color precursor being selected from the group consisting of lactone phthalides, lactone fluoranes and mixtures thereof; and (b) a liquid radiation curable substance, said liquid radiation curable substance being selected from the group consisting of: isocyanate modified acrylic, methacrylic and itaconic acid esters of polyhydric alcohols, acrylic preopolymers derived from partial esterification of pentaerythritol with acrylic acid and acrylic acid esters and mixtures thereof, said liquid radiation curable substance being curable to a frangible resin upon exposure to radiation, said coating composition having a viscosity in the range of about 1000 cps. to about 3500 cps.

2. The coating composition of claim 1 wherein said weakly polar solvent is selected from the group consisting of:

alkylated biphenyls, polychlorinated biphenyls, dioctylphthalate, castor oil, mineral oil, naphthenic mineral oils and mixtures thereof.

* * * * *